(12) United States Patent
Lee et al.

(10) Patent No.: US 8,800,905 B2
(45) Date of Patent: Aug. 12, 2014

(54) MIXING VESSEL

(75) Inventors: Kwok Kay Lee, Hong Kong (CN); Chun Yu Liu, Hong Kong (CN)

(73) Assignee: Main Power Electrical Factory Ltd., Honk Kong (CN)

( * ) Notice: Subject to any disclaimer, the term of this patent is extended or adjusted under 35 U.S.C. 154(b) by 349 days.

(21) Appl. No.: 13/023,053

(22) Filed: Feb. 8, 2011

(65) Prior Publication Data

US 2012/0199682 A1    Aug. 9, 2012

(51) Int. Cl.
*B02C 4/06* (2006.01)

(52) U.S. Cl.
USPC ........................................... 241/282.1

(58) Field of Classification Search
USPC .................. 241/92, 282.1, 282.2, 278.1
See application file for complete search history.

(56) References Cited

U.S. PATENT DOCUMENTS

| | | | |
|---|---|---|---|
| 2,771,111 A * | 11/1956 | Seyfried | 241/292.1 |
| 2,924,349 A | 2/1960 | Huck | |
| 4,087,053 A | 5/1978 | Voglesonger | |
| 4,101,082 A * | 7/1978 | Mayer et al. | 241/282.1 |
| 4,620,476 A | 11/1986 | Brym | |
| 5,323,973 A * | 6/1994 | Ferrara, Jr. | 241/37.5 |
| 5,823,672 A | 10/1998 | Barker | |
| 6,193,181 B1 | 2/2001 | Astegno et al. | |
| 6,604,455 B2 | 8/2003 | Arch et al. | |
| 6,632,013 B2 * | 10/2003 | Wulf et al. | 366/199 |
| 6,641,298 B2 | 11/2003 | Safont et al. | |
| 6,676,051 B2 * | 1/2004 | Rebordosa et al. | 241/73 |
| 6,718,867 B2 | 4/2004 | Hatakeyama | |
| 7,011,013 B2 | 3/2006 | Leason | |
| 7,063,456 B2 | 6/2006 | Miller et al. | |
| 7,217,028 B2 | 5/2007 | Beesley | |
| 7,350,963 B2 | 4/2008 | Williams et al. | |
| 7,374,117 B2 * | 5/2008 | Lin et al. | 241/273.3 |
| 7,422,361 B2 | 9/2008 | Pryor, Jr. et al. | |
| 7,641,380 B2 * | 1/2010 | Behar et al. | 366/205 |
| 7,665,885 B2 | 2/2010 | Pryor, Jr. | |

(Continued)

FOREIGN PATENT DOCUMENTS

| | | |
|---|---|---|
| CN | 2600226 Y | 1/2004 |
| CN | 2640367 Y | 9/2004 |

(Continued)

OTHER PUBLICATIONS

State Intellectual Property Office of the People'S Republic of China, International Search Report in International Patent Application No. PCT/IB2011/001178 (Nov. 20, 2011).

*Primary Examiner* — Faye Francis

(74) *Attorney, Agent, or Firm* — Leydig, Voit & Mayer, Ltd.

(57) ABSTRACT

A mixing vessel, that is used with a motorized food processor, has a vessel wall with an cylindrical upper section and a frustoconical lower section. The upper section has a longitudinal axis generally centered within the upper section and an upper opening defining an upper end of the vessel wall. The lower section is tapered towards a lower circular opening defining a lower end of the vessel wall and has contiguous cambered protuberances defining a hypocycloidal inner surface within the lower section. A base removably closes the lower circular opening and has an upwardly tapered structure and a vertical rotational spindle. A blade assembly is locatable on the spindle. The blade assembly has a pair of upwardly extending blade arms, a pair of radially extending blade arms, and a pair of downwardly extending blade arms.

8 Claims, 4 Drawing Sheets

(56) References Cited

U.S. PATENT DOCUMENTS

| | | |
|---|---|---|
| 7,681,815 B2 * | 3/2010 | Obersteiner .................... 241/73 |
| 7,712,951 B2 | 5/2010 | Bohannon, Jr. et al. |
| 8,251,573 B2 * | 8/2012 | Chou ........................... 366/205 |
| 2002/0098268 A1 | 7/2002 | Cohen et al. |
| 2002/0139884 A1 * | 10/2002 | Williams et al. ............ 241/282.1 |
| 2005/0068846 A1 * | 3/2005 | Wulf et al. .................... 366/199 |
| 2005/0122837 A1 | 6/2005 | Bravard et al. |
| 2006/0018189 A1 | 1/2006 | Chang Chien |
| 2006/0169812 A1 * | 8/2006 | Galban et al. ............... 241/282.1 |
| 2006/0208119 A1 * | 9/2006 | Mally ......................... 241/282.2 |
| 2007/0041268 A1 | 2/2007 | Beesley et al. |
| 2007/0165484 A1 | 7/2007 | Branson, Jr. et al. |
| 2007/0247966 A1 | 10/2007 | Miller et al. |
| 2008/0089170 A1 | 4/2008 | Larsen et al. |
| 2009/0114616 A1 | 5/2009 | White et al. |
| 2009/0308265 A1 | 12/2009 | Obersteiner |
| 2010/0208548 A1 | 8/2010 | Hemelgarn et al. |
| 2010/0300307 A1 | 12/2010 | Huang |
| 2011/0032792 A1 | 2/2011 | Liang et al. |

FOREIGN PATENT DOCUMENTS

| | | |
|---|---|---|
| CN | 101292842 A | 10/2008 |
| CN | 201171620 Y | 12/2008 |
| CN | 101779928 A | 7/2010 |
| DE | 42 42 289 A1 | 6/1994 |
| DE | 195 39 382 C1 | 1/1997 |
| EP | 0 514 371 A1 | 11/1992 |
| EP | 2 071 989 A1 | 6/2009 |
| EP | 2 071 990 A1 | 6/2009 |
| EP | 2 229 853 A1 | 9/2010 |
| FR | 1.143.272 A | 9/1957 |
| FR | 2786385 A1 | 6/2000 |
| FR | 2925275 A1 | 6/2009 |
| GB | 747764 | 4/1956 |
| GB | 1 339 827 | 12/1973 |
| GB | 2 238 712 A | 6/1991 |
| GB | 2 398 733 B | 3/2005 |
| JP | 1-221121 A | 9/1989 |
| WO | WO 96/15706 A1 | 5/1996 |
| WO | WO 03/105612 A1 | 12/2003 |

* cited by examiner

MIXING VESSEL

FIELD OF THE INVENTION

The present invention relates to mixing vessels and in particular to a mixing vessel for use with a motorized food processor or blender.

BACKGROUND TO THE INVENTION

Food processors, oftentimes referred to as blenders, are use to chop, blend or mix a wide variety of foods and beverages, including hot and cold liquids and solids such as ice, fruits, vegetables and the like. In a typical blender, a vessel is provided that removable locates on a base comprising an electric motor. A blade assembly having a plurality of blades is located near the bottom of the vessel and is driven by the motor via a coupling means when the vessel is located on the base.

In order to properly chop, blend or mix foods and beverages they must properly circulate around the vessel and through the blade assemble during operation of the processor. Liquids for example are drawn down the centre of the vessel through the blades and expelled upwardly along the sides of the vessel. However, solids or liquids of a thick consistency or large volume are sometimes unable to circulate properly around the vessel. These solids and thick liquids form a arch around the blades rather than moving through the blades.

SUMMARY OF THE INVENTION

It is an object of the present invention to provide a mixing vessel and a blade design that aids chopping, blending and/or mixing of a wide variety of foods and beverages.

According to a first aspect of the invention there is provided a mixing vessel for use with a motorize food processor, the vessel comprising: a vessel wall including an cylindrical upper section having a longitudinal axis generally centred within the upper section and an upper opening defining an upper end of the vessel wall, and a frustoconical lower section tapered towards a lower circular opening defining a lower end of the vessel wall and a plurality of contiguous cambered protuberances forming a hypocycloidal inner surface within the lower section, a base for removably closing the lower circular opening, the base having a upwardly tapered structure and a vertical rotational spindle, and a blade assembly located at on the spindle, the blade assembly comprising a pair of upwardly extending blade arms, a pair of radically extending blade arms and a pair of downwardly extending blade arms.

Preferably, the spindle and blade assembly are rotational about a rotational axis that is off-set from the longitudinal axis.

Preferably, the pair of downwardly extending blade arms are parallel with surfaces of the upwardly tapered structure.

Preferably, the blade assembly comprises a single sheet of metal having a central hub for engagement with the spindle and wherein the pairs of blade arms are circumferentially spaced about the hub.

Preferably, the spindle and blade assembly are rotational about a rotational axis that is inclined at an angle relative to the longitudinal axis.

Preferably, the upwardly tapered structure comprises a lower frustoconical portion and an upper cylindrical portion, and wherein the downwardly extending blade arms are bent at an intermediary location to be parallel with surfaces of the frustoconical and cylindrical portions of the base.

Preferably, the upper section further comprises a plurality of inwardly extending circumferentially spaced elongate ribs.

Preferably, the lower opening is smaller than the upper opening, the two openings being eccentric.

According to a second aspect of the invention there is provided a mixing vessel for use with a motorize food processor, the vessel comprising:
a vessel wall including an cylindrical upper section having a longitudinal axis generally centred within the upper section and an upper opening defining an upper end of the vessel wall, and a frustoconical lower section tapered towards a lower circular opening defining a lower end of the vessel wall, the lower opening being smaller than the upper opening, the two openings being eccentric,
a base for removably closing the lower circular opening, the base having a upwardly tapered structure and a vertical rotational spindle, and
a blade assembly located at on the spindle, the blade assembly comprising a pair of upwardly extending blade arms, a pair of radically extending blade arms and a pair of downwardly extending blade arms, and wherein the spindle and blade assembly are rotational about a rotational axis that is off-set from the longitudinal axis.

Preferably, the pair of downwardly extending blade arms are parallel with surfaces of the upwardly tapered structure.

Preferably, the blade assembly comprises a single sheet of metal having a central hub for engagement with the spindle and wherein the pairs of blade arms are circumferentially spaced about the hub.

Preferably, the spindle and blade assembly are rotational about a rotational axis that is inclined at an angle relative to the longitudinal axis.

Preferably, the upwardly tapered structure comprises a lower frustoconical portion and an upper cylindrical portion, and wherein the downwardly extending blade arms are bent at an intermediary location to be parallel with surfaces of the frustoconical and cylindrical portions of the base.

According to a third aspect of the invention there is provided a mixing vessel for use with a motorize food processor, the vessel comprising:
a vessel wall including an cylindrical upper section having a longitudinal axis generally centred within the upper section and an upper opening defining an upper end of the vessel wall, and a frustoconical lower section tapered towards a lower circular opening defining a lower end of the vessel wall, the lower opening being smaller than the upper opening,
a base for removably closing the lower circular opening, the base having a upwardly tapered structure and a vertical rotational spindle, and
a blade assembly located at on the spindle, the blade assembly comprising a single sheet having a but for engaging with the spindle, pair of upwardly extending blade arms, a pair of radically extending blade arms and a pair of downwardly extending blade arms, wherein the pairs of blade arms are circumferentially spaced about the hub Preferably, the spindle and blade assembly are rotational about a rotational axis that is off-set from the longitudinal axis.

Preferably, the pair of downwardly extending blade arms are parallel with surfaces of the upwardly tapered structure.

Preferably, the lower vessel section comprises a plurality of contiguous cambered protuberances forming a hypocycloidal inner surface within the lower section Preferably, the spindle and blade assembly are rotational about a rotational axis that is inclined at an angle relative to the longitudinal axis.

Preferably, the upwardly tapered structure comprises a lower frustoconical portion and an upper cylindrical portion, and wherein the downwardly extending blade arms are bent at an intermediary location to be parallel with surfaces of the frustoconical and cylindrical portions of the base.

Preferably, the upper section further comprises a plurality of inwardly extending circumferentially spaced elongate ribs.

Further aspects of the invention will become apparent from the following description and appended drawings, which are given by way of example only to illustrate one or more preferred embodiments of the invention.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
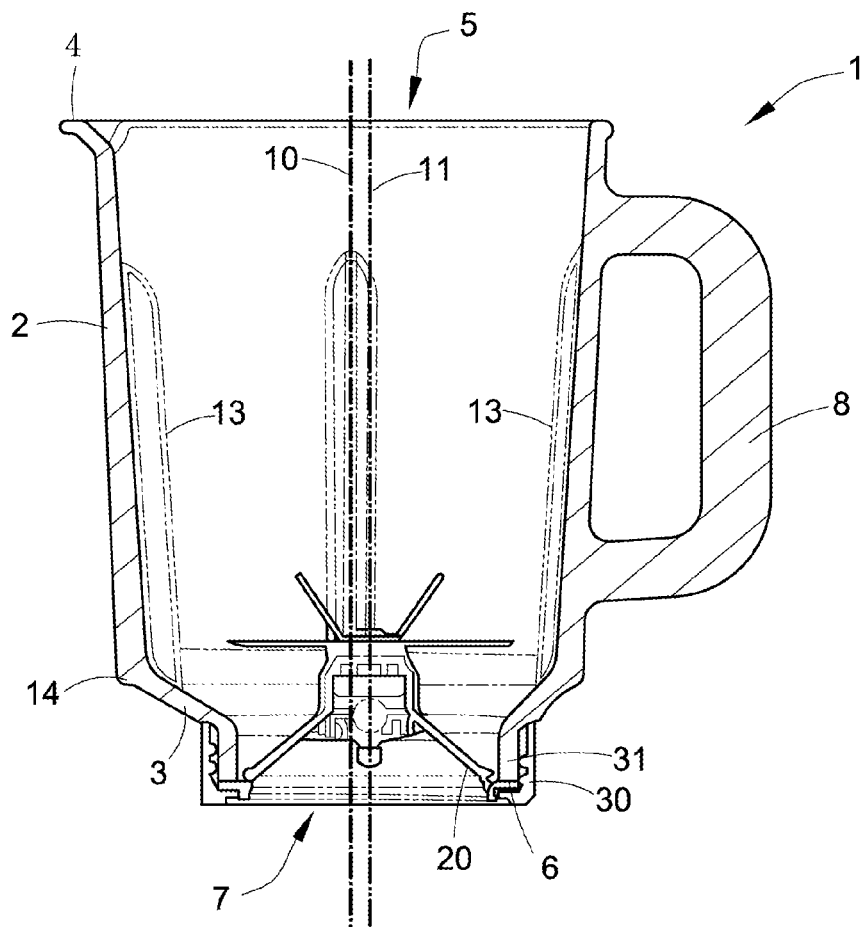
FIG. 1 is a cross section view of a mixing vessel without base or blade assembly.
Figure 2:
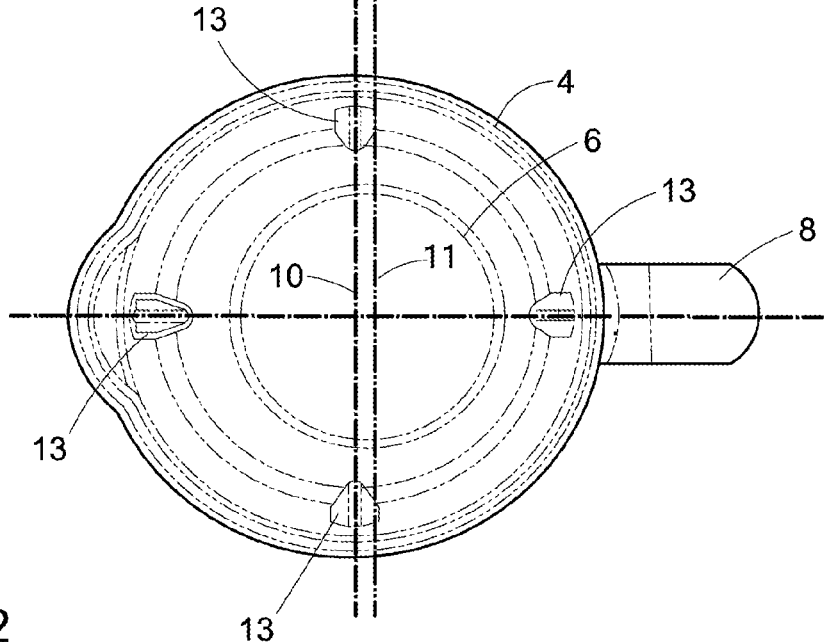
FIG. 2 is a top view of the vessel of FIG. 1.
Figure 3:
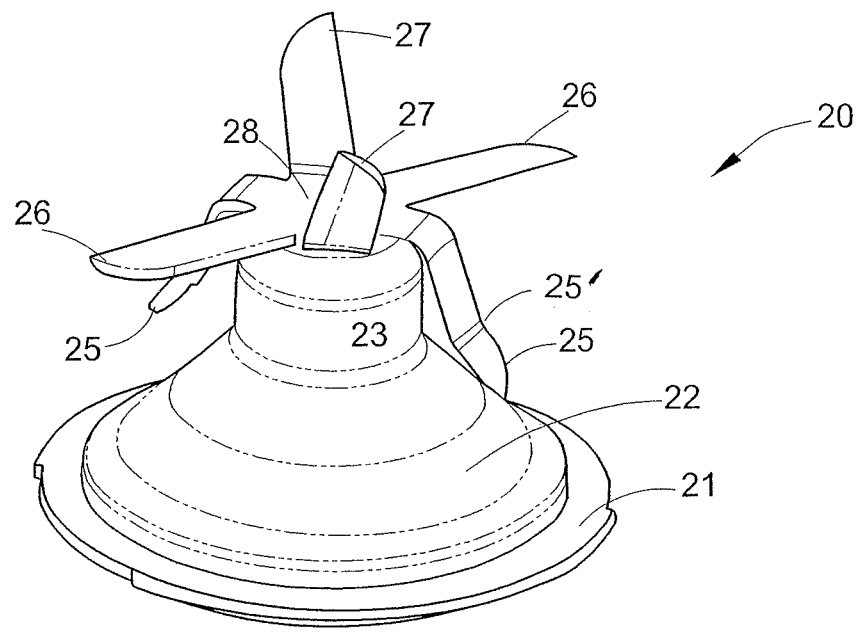
FIG. 3 is a illustration of a base and blade assembly for the mixing vessel.

Before any embodiments of the invention are described in detail, it is to be understood that the invention is not limited in its application to the details of arrangements set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting.

In the drawings there is illustrated a preferred embodiment of a mixing vessel 1 according to the invention. The vessel has a wall which includes a cylindrical upper section 2 and a frustoconical lower section 3. The top edge 4 of the wall defines a first top opening 5 in the vessel and the lower edge 6 of the wall defines a second bottom or lower opening in the vessel. The lower frustoconical section 3 of the wall is tapered towards the lower circular opening 7, which is smaller than the upper opening 5. The cylindrical upper section 2 defines a first longitudinal axis 10 generally centred within the upper section 2. The lower frustoconical section 3 of the wall defines a second longitudinal axis 11 generally centred with the lower circular opening 7. The second longitudinal axis 11 is off-set from the first longitudinal axis 10 such that the upper and lower openings 5, 7 eccentric. The lower vessel section 3 has a plurality of contiguous cambered protuberances 12 formed on its inner surface. The contiguous cambered protuberances 12 extend about the entire circumference of the tapered part of the lower vessel section 3 to form a hypocycloidal inner surface within the lower section of the vessel. The cylindrical upper section 2 of the wall has four of inwardly extending circumferentially spaced elongate ribs 13 which extend longitudinally from the junction 14 between the upper and lower sections of the wall for about two-thirds of the length of the cylindrical upper section 2.

The lower circular opening 7 is closed by an upwardly tapered base structure 20. The base 20 comprises a flange 21 which abuts against the lower edge 6 of the vessel wall. The base is removably secured by a ring 30 threadably engaged with threaded lip 31 formed at the lower edge 6 of the vessel wall. The upwardly tapered base structure 20 includes a lower frustoconical portion 22 and an upper cylindrical portion 23 which extend through the lower opening 7 to a height adjacent the junction 14 between the upper and lower sections of the wall. The upwardly tapered base structure 20 is located within the lower frustoconical section 3 of the wall with its top 28 at the level of the bottom of the cylindrical upper section 2. A vertical rotational spindle 24 is located through the centre of the base and has a blade assembly attached to its top end within the vessel. The lower end of the spindle 24 has a coupling means for engagement of a complementary motor drive coupling means (not shown). The spindle 24 and blade assembly are rotational about the second longitudinal axis 11 and thus are also off-set from the first longitudinal axis 10. The blade assembly is at the top of the base and within the lower part of the cylindrical upper section 2 of the vessel. The spindle is off-set from the centre of the cylindrical upper section 2 of the vessel.

Figure 4:
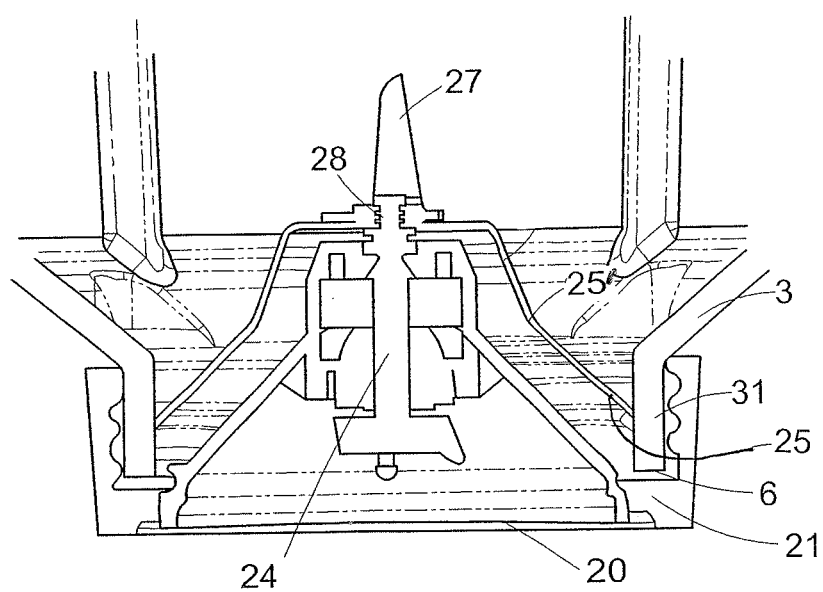
FIG. 4 illustrates the base and blade assembly fitted with the mixing vessel.
Figure 5:
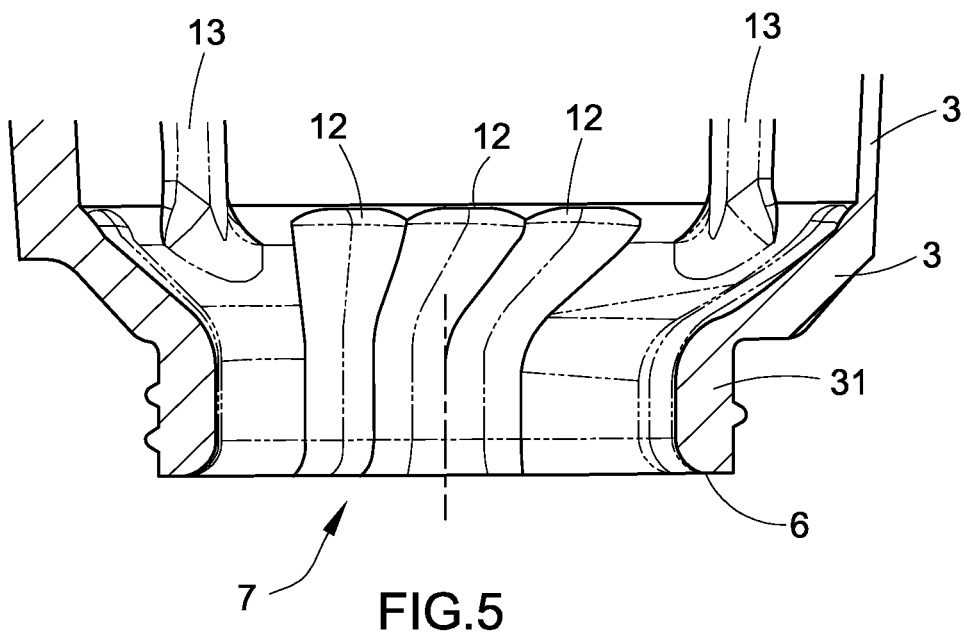
FIG. 5 is a cross section view illustrating a hypocycloidal inner surface of the lower portion of the vessel.
Figure 6:
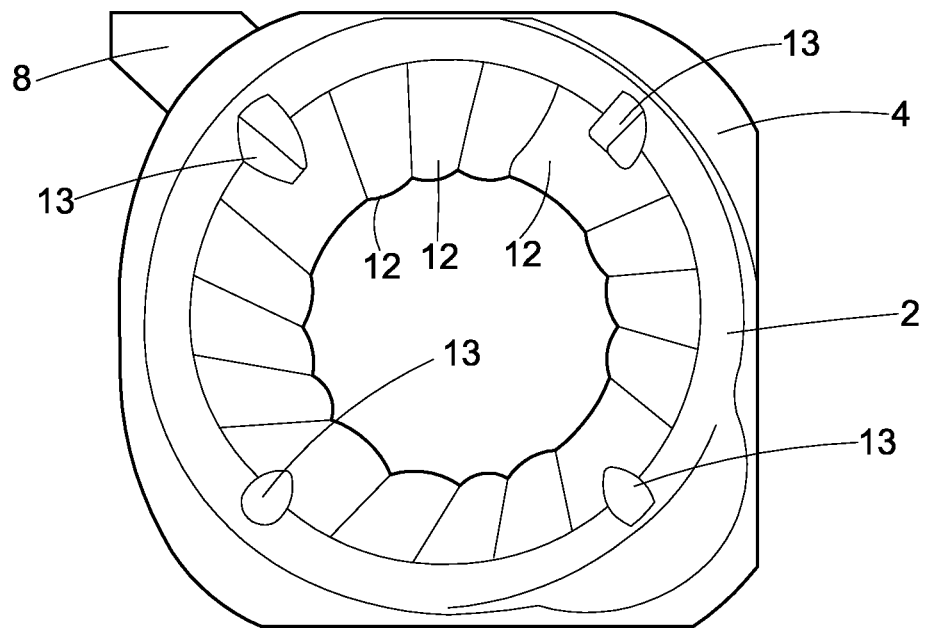
FIG. 6 is a top view illustrating the hypocycloidal inner surface of the lower portion of the vessel.
Figure 7:
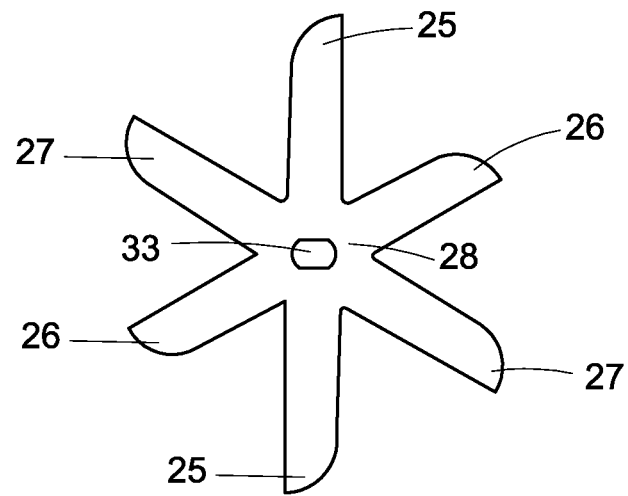
FIG. 7 is an illustration of blade before bending of the blade arms.

The blade assembly is located on the spindle 24 and is made of a single sheet of metal. Referring to FIG. 7, the blade sheet has a hub 28 at its centre which has an opening 33 engaging the top of the spindle 24. Six circumferentially spaced blade arms extend from the hub 28. A first diametrically opposite pair of the arms are bent upwardly to form upper blades 27, a second diametrically opposite pair of the blade arms extend radially from the hub in a horizontal plane to form centre blades 26, and a third diametrically opposite pair of the blade arms are bent downwardly for form lower blades 25, wherein the pairs of blade arms are circumferentially spaced about the hub. The blade arms, which include the lower blades 25, are bent at an intermediary location 25' so the lower blades 25 are parallel to the frustoconical surface portion 22 of the base 20 when viewed in cross-section as shown in FIG. 4. This arrangement helps to avoid blockages during blending.

The complementary double tapered arrangement of the lower frustoconical wall portion 3 and upwardly tapered base structure 20 shape the bottom space of the vessel, which combined with the action of the lower blades 25 causes thick food or liquids to be circulated rather than stay under the lower blades. The hypocycloidal inner surface within the lower section of the vessel causes a vortex action between the lower and centre blades 25, 26 to achieve improved blending. The ribs 13 of the upper cylindrical section 2 of the vessel help guide upwards follow during blending. The upwards flow circulates down the centre of the cylindrical section 2 of the vessel to the upper and centre blades 27, 26.

Figure 8:
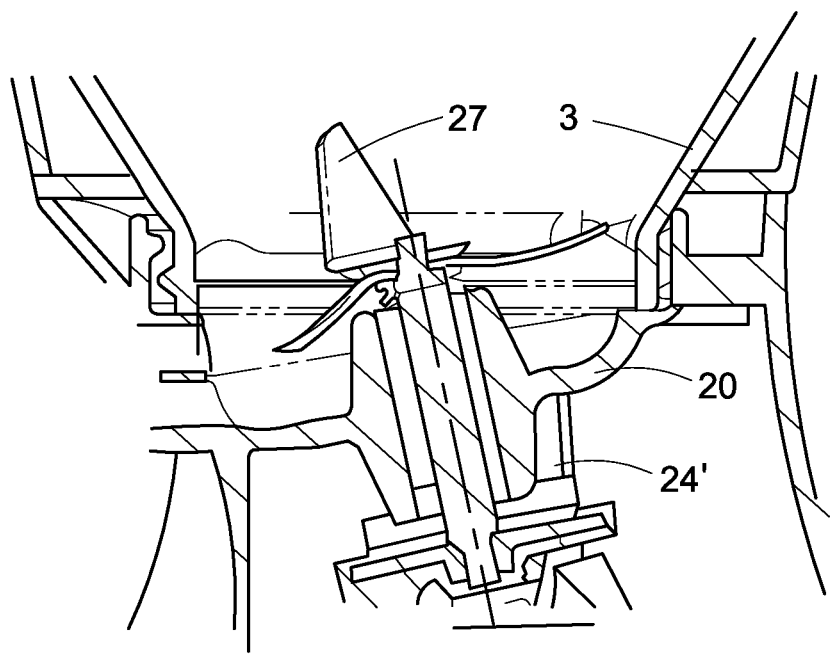
FIG. 8 is an illustration of an alternative embodiment of the invention with inclined spindle and blade assembly.

FIG. 8 illustrates an alternative embodiment of the vessel wherein the spindle 24 and blade assembly are rotational about a rotational axis 35 that is inclined at an angle relative to the longitudinal axis 10, which helps achieve improved blending.

What is claimed is:

1. A mixing vessel for use with a motorized food processor, the vessel comprising:
 a vessel wall including
  a cylindrical upper section having a first longitudinal axis generally centered within the upper section, and an upper opening defining an upper end of the vessel wall, a frustoconical lower section tapered towards a lower circular opening defining a lower end of the vessel wall and having a second longitudinal axis generally centered within the lower circular opening, and a plurality of contiguous cambered protuberances defining a hypocycloidal inner surface within the frustoconical lower section;

a base removably closing the lower circular opening, the base having a upwardly tapered structure and a spindle that is mounted on and rotatable about a rotational axis with respect to the tapered structure; and a blade assembly mounted on the spindle, the blade assembly comprising a pair of upwardly extending blades, a pair of radially extending blades, and a pair of downwardly extending blades.

2. The vessel of claim 1 wherein, when the base closes the lower circular opening, the rotational axis of the spindle and the first longitudinal axis are substantially parallel and off-set from each other.

3. The vessel of claim 1 wherein the blade assembly comprises a central hub engaging the spindle and the pairs of upward extending blades, radially extending blades, and downwardly extending blades, and the pairs of upwardly extending blades, radially extending blades, and downwardly extending blades are circumferentially spaced from each other about the hub.

4. The vessel of claim 1 wherein, when the base closes the lower circular opening the rotational axis of the spindle is inclined at an angle relative to the first longitudinal axis.

5. The vessel of claim 1 wherein the upwardly tapered structure of the base comprises a lower frustoconical portion and an upper cylindrical portion, the downwardly extending blades are parts of arms of the blade assembly that are bent at an intermediate location between the spindle and the downwardly extending blades, the downwardly extending blades are flat, and the downwardly extending blades are parallel to the frustoconical portion of the base when viewed transverse to a plane including the first longitudinal axis and the rotational axis.

6. The vessel of claim 1 wherein the upper section further comprises a plurality of inwardly extending circumferentially spaced elongate ribs.

7. The vessel of claim 1 wherein the lower opening is smaller than the upper opening, and the upper and lower openings are eccentrically located relative to each other.

8. The vessel of claim 3 wherein the blade assembly comprises a single sheet of metal.

* * * * *